US006969188B2

(12) United States Patent  (10) Patent No.: US 6,969,188 B2
Kuo  (45) Date of Patent: Nov. 29, 2005

(54) LIGHT SOURCE SUBSTRATE

(76) Inventor: Heng Sheng Kuo, P.O. Box 26-757, Taipei (TW)

( * ) Notice: Subject to any disclaimer, the term of this patent is extended or adjusted under 35 U.S.C. 154(b) by 77 days.

(21) Appl. No.: 10/719,742

(22) Filed: Nov. 18, 2003

(65) Prior Publication Data

US 2005/0117319 A1  Jun. 2, 2005

(51) Int. Cl.⁷ .............................................. F21V 7/04
(52) U.S. Cl. .................... 362/613; 362/27; 362/247
(58) Field of Search ....................... 362/555, 241, 362/247, 235, 800, 27, 26, 601, 608, 609, 362/613

(56) References Cited

U.S. PATENT DOCUMENTS

| 5,119,174 | A  | * | 6/1992  | Chen ........................... 257/98 |
| 6,193,392 | B1 | * | 2/2001  | Lodhie ....................... 362/235 |
| 6,283,612 | B1 | * | 9/2001  | Hunter ....................... 362/240 |
| 2003/0227768 | A1 | * | 12/2003 | Hara et al. .................... 362/31 |

\* cited by examiner

Primary Examiner—Ali Alavi
(74) Attorney, Agent, or Firm—Rosenberg, Klein & Lee

(57) ABSTRACT

A light source substrate adopted for a backlight module has a printed circuit board, a lighting assembly disposed on the printed circuit board, and a reflection member arranged on a surface, from which light emits, of the printed circuit board, whereby the reflection member reflects the light to the backlight module.

4 Claims, 6 Drawing Sheets

LIGHT SOURCE SUBSTRATE

BACKGROUND OF THE INVENTION

1. Field of the Invention

The present invention relates to a light source substrate adopted for a back light module, and particularly relates to a light source substrate with enhanced light intensity.

2. Background of the Invention

As technology develops, modern life closely relates to instruments, computers and appliances, and especially directly relates to those with display devices in a face-to-face manner. The conventional display device applied for an electron beam shows images on a curved or a flat screen; due to the cathode ray tubes thereof, the conventional display device occupies a certain degree of volume and does not meet current requirements for lightness and thinness.

Subsequently, display devices with a backlight module are becoming competitive. As the current liquid crystal display with a thickness one third that of the conventional television saves space, the notebooks have become thinner thinned and lighter for greater mobility, and desk monitors are being discarded in favor of LCD monitors. The variety leads to visual aesthetics and further applies to a scanner to improve a scanning quality thereof.

The conventional backlight module briefly includes a base, a reflection member, a lighting member, a guide light and a diffuser. Referring to FIG. 1, a conventional backlight module includes a guide light 9 and a substrate 8 disposed on an elongated sidewall of the guide light 9. The substrate 8 has a printed circuit board 80, and a plurality of LEDs (light emitting device) 81 and resistors 82. The guide light 9 is a rectangular, flat, thin, transparent plate.

The substrate 8 is usually composed of the boards 80, which mostly are manufactured with dark colors, i.e. blackish green, and the light emitted from the LEDs 81 easily is absorbed by the dark-colored boards 80 so that no light is resident and reflected to the guide light 9.

Hence, an improvement in the prior art is required to overcome the disadvantages thereof.

SUMMARY OF INVENTION

The primary object of the invention is therefore to specify a light source substrate adopted for a backlight module with a reflection member predetermined to dispose uniquely, light emitted therefrom is efficiently transmitted to a guide light for improving a uniformity and illumination of the backlight module, decreasing the quantity of the LEDs and saving time, cost and power.

According to the invention, this object is achieved by a light source substrate adopted for a backlight module. The light source substrate includes a printed circuit board, a lighting assembly disposed on the printed circuit board, and a reflection member arranged on a surface, from which light emits, of the printed circuit board.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE EMBODIMENTS

Figure 1:
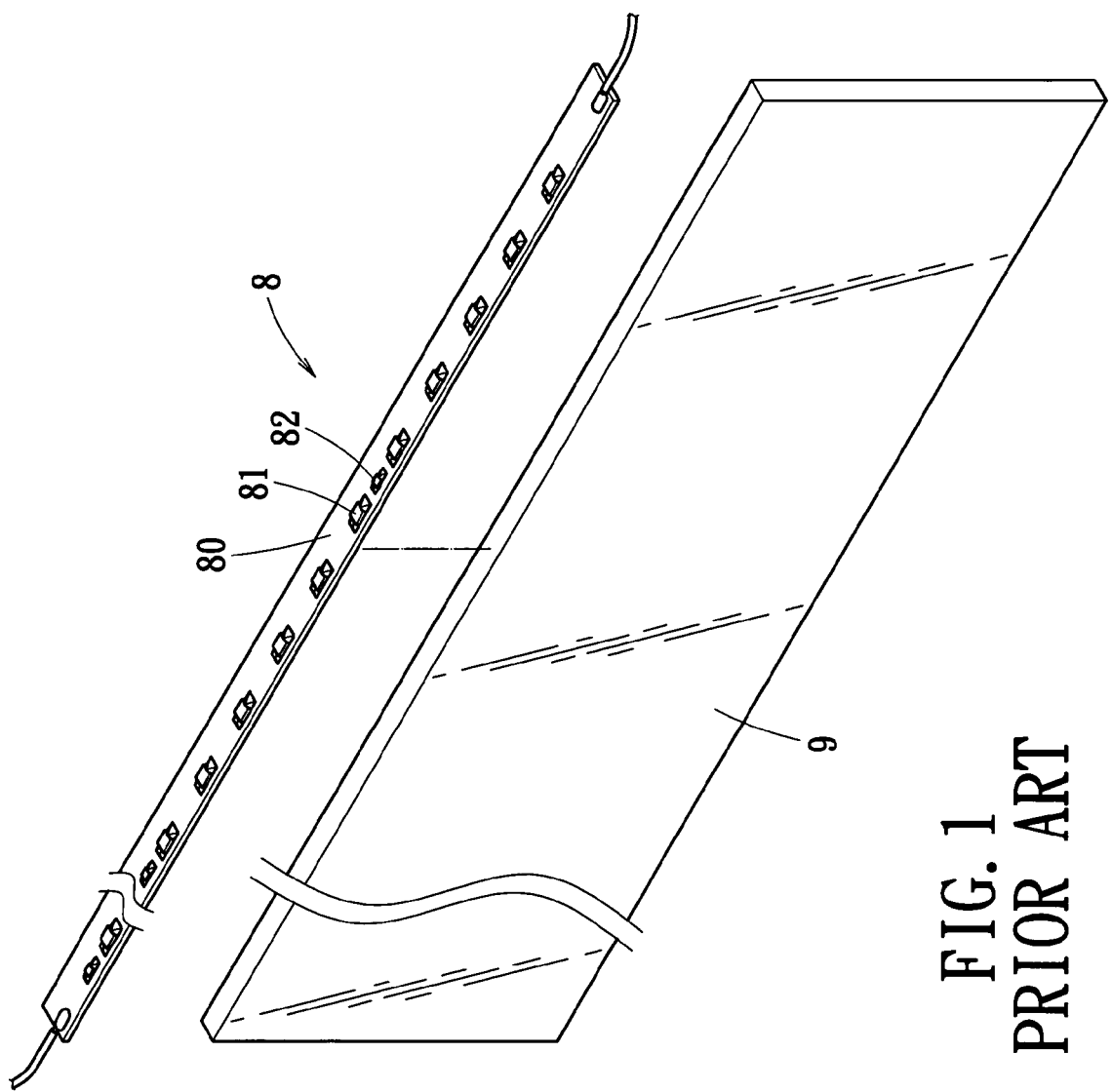
FIG. 1 is an exploded view according to a conventional light source substrate and a conventional guide light.
Figure 2:
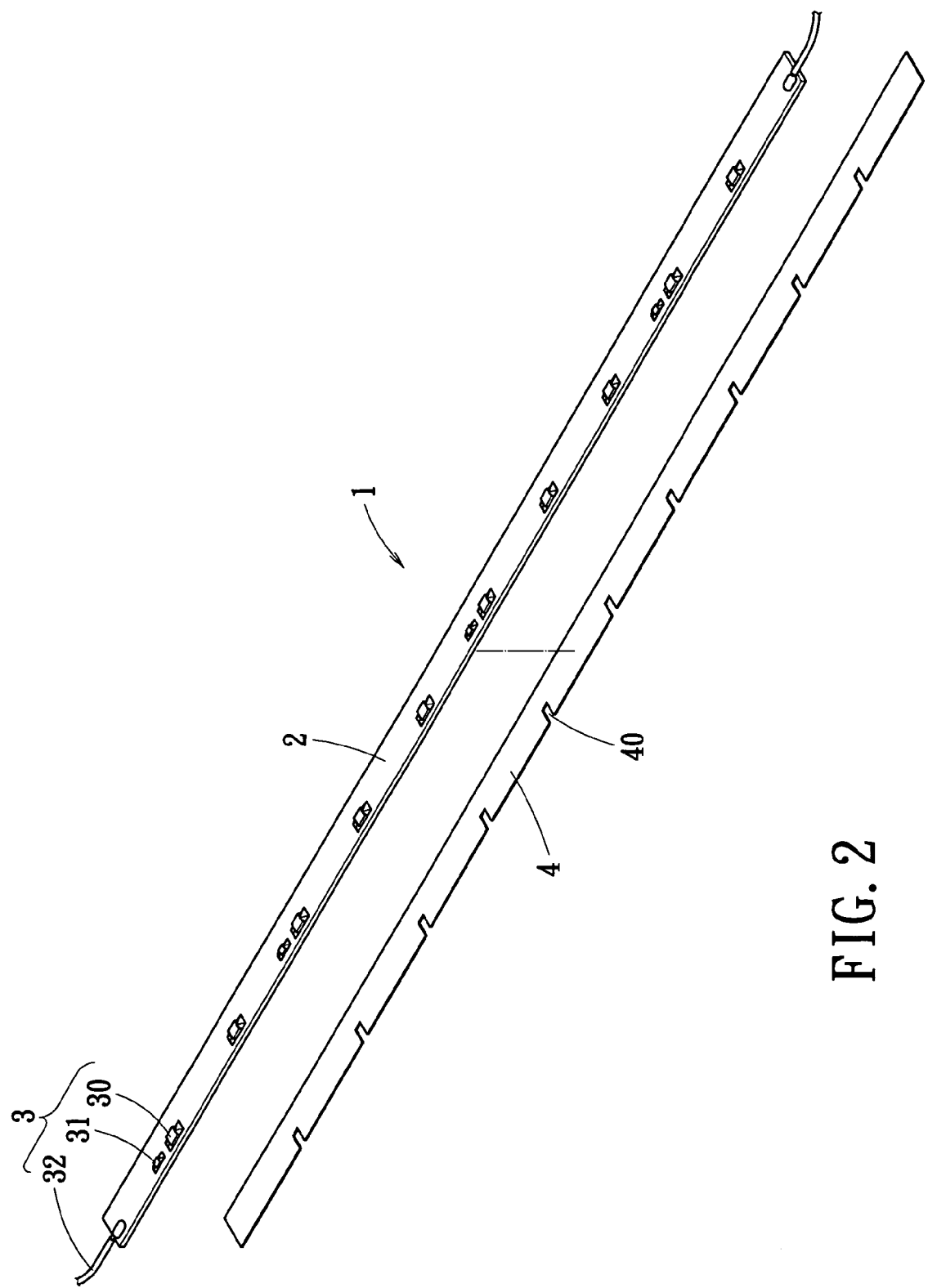
FIG. 2 is an exploded view according to the present invention light source substrate.
Figure 3:
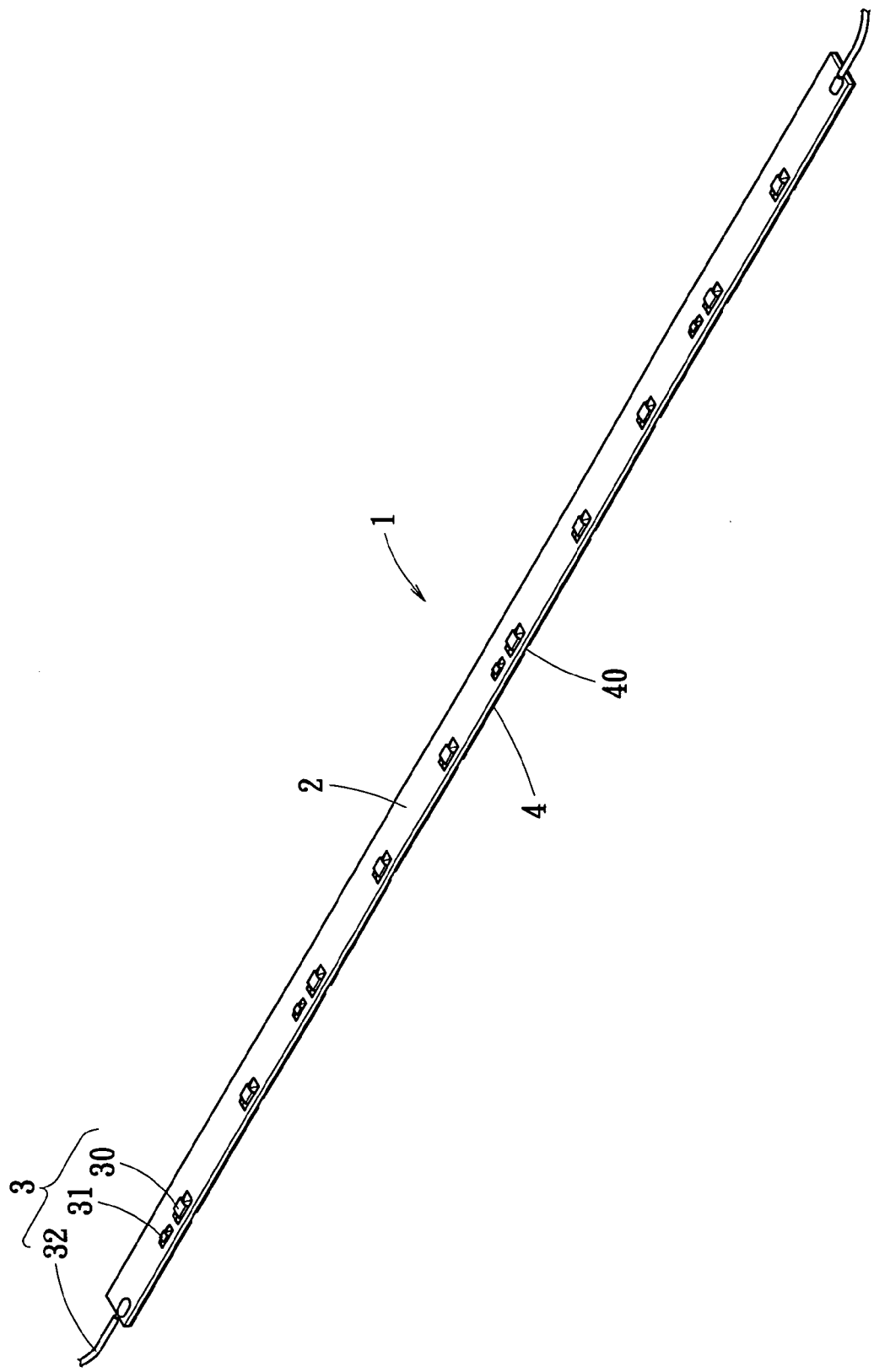
FIG. 3 is a perspective view according to the present invention light source substrate.
Figure 4:
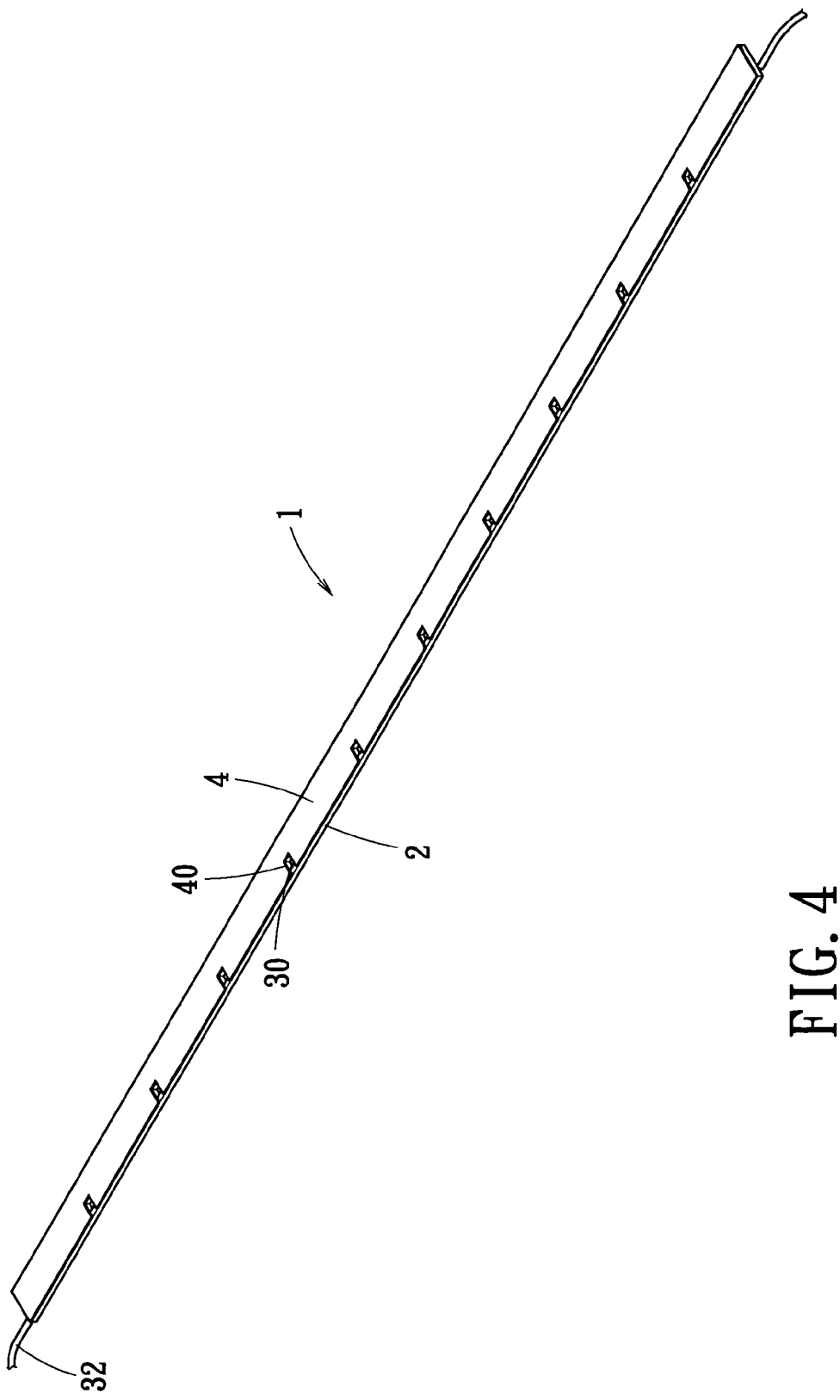
FIG. 4 is a perspective view from another angle according to the present invention light source substrate.

With respect to FIG. 2 to FIG. 4, the present invention provides a light source substrate 1 adopted for a backlight module including a printed circuit board 2, a lighting assembly 3 disposed on the printed circuit board 2, and a reflection member 4 arranged on a predetermined surface, from which light emits, of the printed circuit board 2, whereby the reflection member 4 reflects the light to the backlight module. The printed circuit board 2 is a dark-colored plate, such as a blackish green plate. The lighting assembly 3 includes a plurality of LEDs 30 and resistors 31 arranged on the printed circuit board 2 in an alternate relationship and two electrical wires 32 respectively electrically connecting two opposing ends of the printed circuit board 2. The reflection member 4 is a white or another light-colored, rectangular shaped sheet to provide good reflection and has a plurality of recesses 40 formed therein and respectively corresponding to the LEDs 30.

Figure 5:
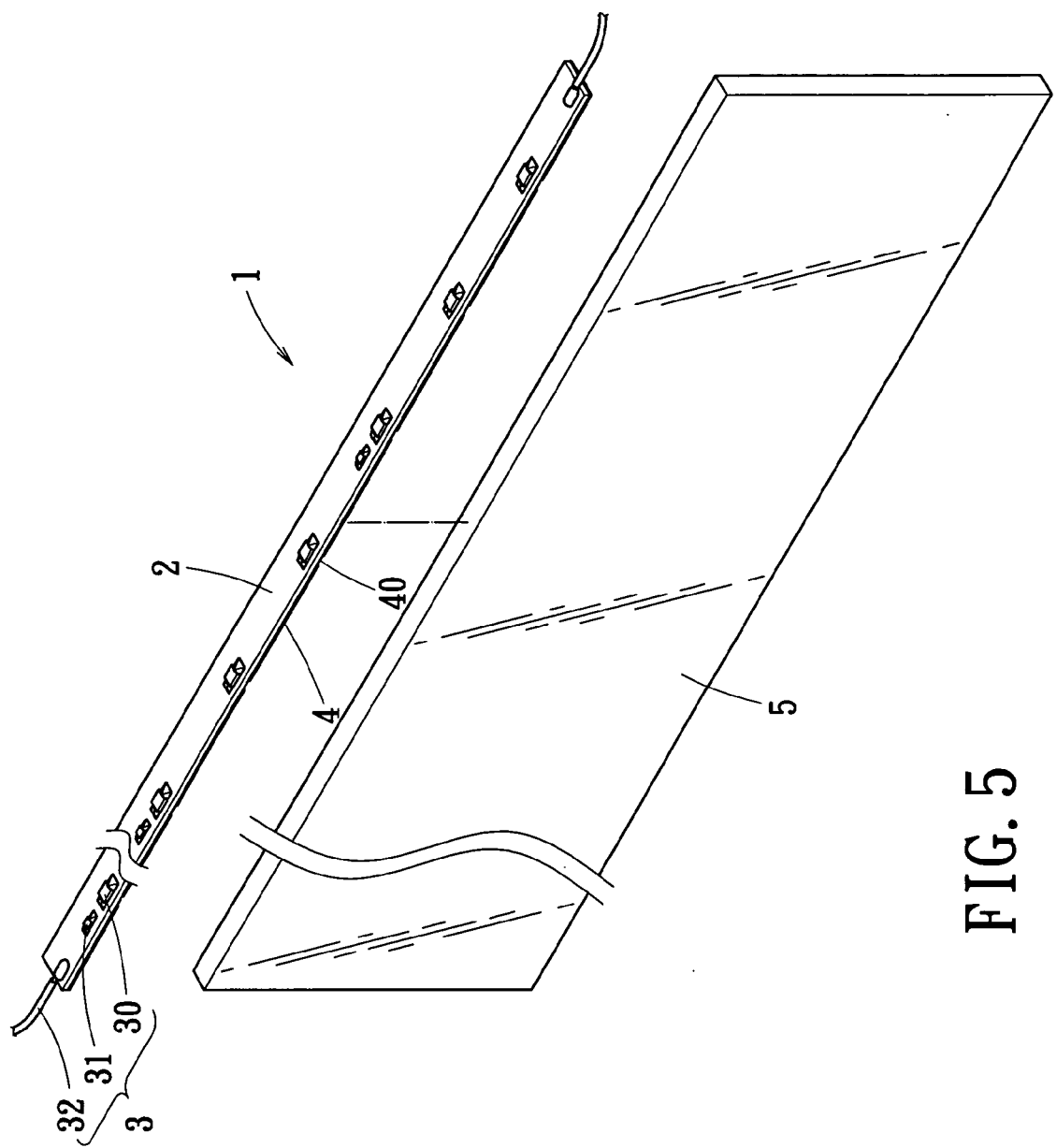
FIG. 5 is an exploded view according to a use state of the present invention light source substrate.
Figure 6:
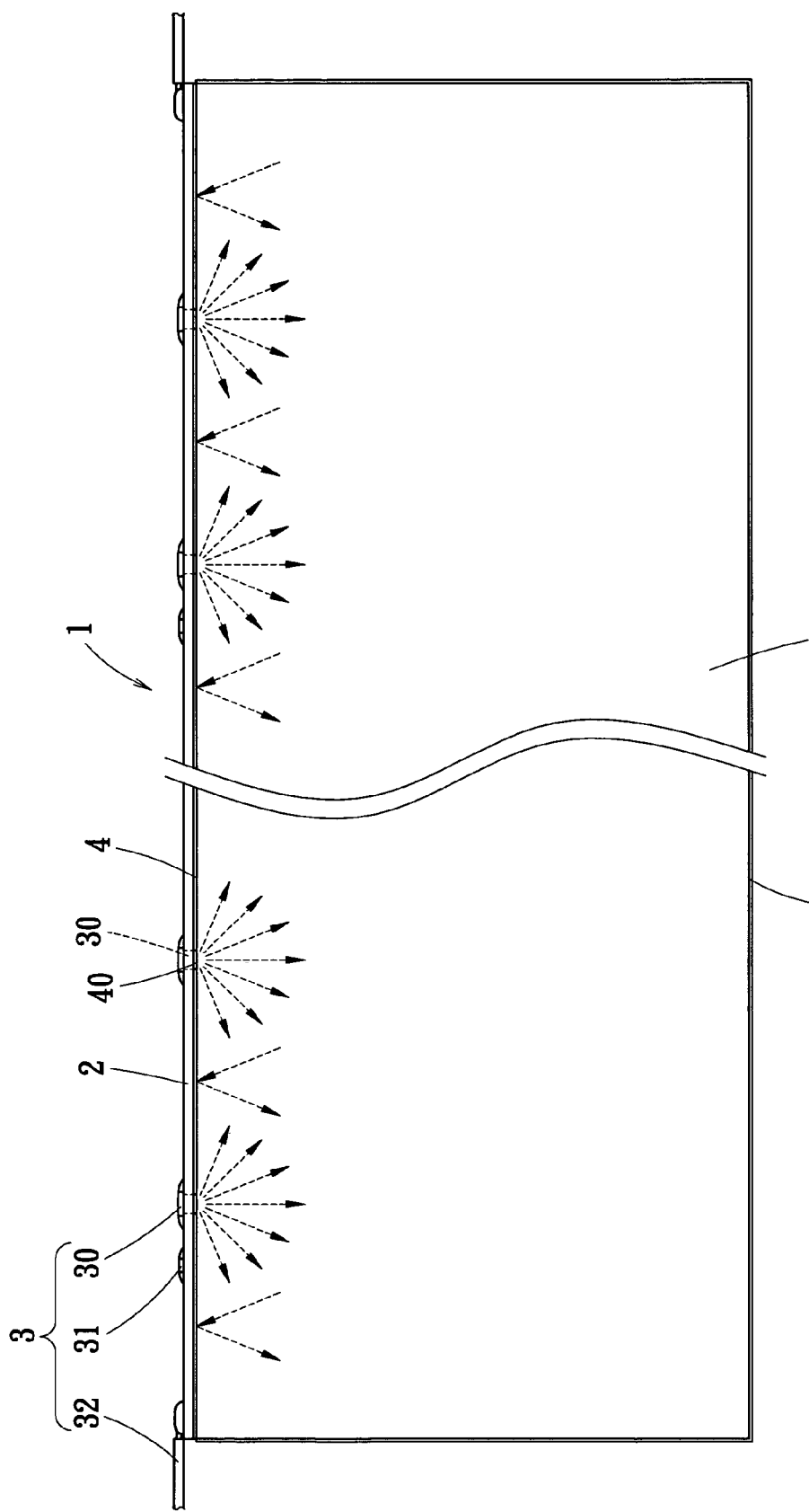
FIG. 6 is a front view according to a use state with light emission of the present invention light source substrate.

Referring to FIG. 5 and FIG. 6, the substrate 1 is disposed on a sidewall of a guide light 5. The LEDs 30 lights transmit into the guide light 5 in a spot manner when the printed circuit board 2 is turned on. Most of the light is transmitted into the backlight module directly and the rest is reflected by the reflection member 4 to the backlight module eventually because the reflection member 4 is a good reflector. The backlight module further includes a reflection unit 50 covering an outside of the guide light 5, and the reflection member 4 further reflects light reflected by the reflection unit 50 to the guide light 5.

Accordingly, the present invention light source substrate 1 is characterized by:

1. increasing the uniformity and the luminance of the backlight module; and
2. minimizing the quantity of the LEDs to save time, cost and power.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A light source substrate adapted for a backlight module, comprising:
- a printed circuit board having opposing first and second sides and a plurality of apertures formed therethrough;
- a lighting assembly including a plurality of LEDs mounted on the first side of the printed circuit board and positioned in correspondence with the apertures;
- a reflection member overlaying the second side of the printed circuit board, the reflection member having a plurality of slotted openings formed therein and in aligned relationship with the apertures for respectively passing light from the plurality of LEDs therethrough, the reflective member having an exposed reflective surface for reflecting light from the plurality of LEDs; and,
- a light guide, the printed circuit board being disposed on an edge portion of the light guide with the reflection member being sandwiched therebetween.

2. The light source substrate of claim 1, wherein the printed circuit board is a dark-colored plate.

3. The light source substrate of claim 1, wherein the reflection member is a light-colored, rectangular shaped sheet.

4. The light source substrate of claim 1, wherein the lighting assembly includes a plurality of resistors arranged on the printed circuit board and respectively coupled to at least a portion of the LEDs, the printed circuit board having two electrical wires respectively connecting two opposing ends thereof.

* * * * *